United States Patent [19]

Yagi et al.

[11] Patent Number: 5,034,465
[45] Date of Patent: Jul. 23, 1991

[54] RUBBER COMPOSITIONS

[75] Inventors: Yoshiro Yagi, Kodaira; Iwakazu Hattori, Tokyo, both of Japan

[73] Assignees: Bridgestone Corporation; Japan Synthetic Rubber, both of Tokyo, Japan

[21] Appl. No.: 442,755

[22] Filed: Nov. 29, 1989

[30] Foreign Application Priority Data

Nov. 29, 1988 [JP] Japan ................... 63-299724

[51] Int. Cl.$^5$ ............................. C08F 8/04
[52] U.S. Cl. ....................... 525/236; 525/237
[58] Field of Search ...................... 525/237, 236

[56] References Cited

U.S. PATENT DOCUMENTS

| | | | |
|---|---|---|---|
| 3,225,122 | 12/1965 | Stumpe, Jr. | 525/237 |
| 3,766,295 | 10/1973 | Crosslaird et al. | 525/236 |
| 3,798,190 | 3/1974 | Yoshimoto et al. | 525/237 |
| 3,848,026 | 12/1974 | Yoshimoto et al. | 525/237 |
| 3,935,893 | 2/1976 | Stang et al. | 525/237 |
| 4,113,799 | 9/1978 | Van Ornum et al. | 525/237 |
| 4,310,582 | 1/1982 | Stumpe, Jr. | 525/237 |
| 4,335,221 | 6/1982 | Gerberding | 525/237 |

*Primary Examiner*—Bernard Lipman
*Attorney, Agent, or Firm*—Sughrue, Mion, Zinn, Macpeak & Seas

[57] ABSTRACT

A rubber composition useful for high performance tires comprises 10–200 parts by weight of a particular low molecular weight diene series hydrogenated polymer based on 100 parts by weight of a particular high molecular weight diene series hydrogenated polymer.

2 Claims, No Drawings

RUBBER COMPOSITIONS

BACKGROUND OF THE INVENTION

1. Field of the Invention

This invention relates to rubber compositions, and more particularly to a rubber composition having high performances such as high hysteresis loss, high gripping force on road surface, good strength at rupture and wear resistance and excellent heat resistance.

2. Related Art Statement

Heretofore, it has been known that polymers having a large hysteresis loss such as emulsion polymerized or solution polymerized styrene-butadiene copolymers having a high bound styrene content, and rubber composition containing a large amount of a softener such as aromatic oil or the like are used in order to improve the gripping force on road surface in the tread of the high performance tire.

However, when using the rubber composition containing the above styrene-butadiene copolymer with the high bound styrene content, the high gripping force is obtained, but the wear resistance and heat resistance are considerably degraded. On the other hand, when a large amount of a softener such as aromatic oil is compounded, the hysteresis loss becomes large, but the strength at rupture, wear resistance and heat resistance are considerably injured.

SUMMARY OF THE INVENTION

It is, therefore, an object of the invention to provide a rubber composition having a large hysteresis loss in rubber component, excellent heat resistance and good breaking properties and wear resistance to thereby improve the performances of a pneumatic tire using this rubber composition as a tread.

The inventors have made studies in order to solve the aforementioned problems and found that the above object can be achieved by a rubber composition containing a diene series hydrogenated polymer of particular high molecular weight and a diene series hydrogenated polymer of particular low molecular weight, and as a result the invention has been accomplished.

According to the invention, there is the provision of a rubber composition comprising 10-200 parts by weight of a low molecular weight diene series polymer having a weight average molecular weight of 5,000-200,000 in which at least 90% of unsaturated bond in diene portion of this polymer is subjected to a hydrogenation, based on 100 parts by weight of a high molecular weight diene series polymer having a weight average molecular weight of not less than 300,000 in which at least 60% of unsaturated bond in diene portion of this polymer is subjected to a hydrogenation.

Moreover, the above diene series polymers are simply shown as high molecular diene series polymer and low molecular diene series polymer hereinafter.

DESCRIPTION OF THE PREFERRED EMBODIMENTS

As the high molecular and low molecular diene series polymers used in the invention, use may be made of various diene series polymers, among which solution polymerized styrene-butadiene copolymer, emulsion polymerized styrene-butadiene copolymer, natural rubber, polyisoprene rubber, polybutadiene rubber and the like are preferable.

Such diene series polymers are usually hydrogenated in the presence of a hydrogenation catalyst such as dicyclopentadienyl, titanium halide, nickel carboxylate, cobalt carboxylate and organic metal compound of Group I–III, a metal catalyst such as nickel, platinum, paradium, ruthenium, rhenium, rhodium or a metal complex catalyst of cobalt, nickel, rhodium or ruthenium, which are carried by carbon, silica, diatomaceous earth or the like, under a hydrogen pressure of 1–100 atmospheric pressure, or in the presence of lithium aluminum hydride, p-toluenesulfonyl hydrazide or a hydrogen storing alloy such as Zr-Ti-Fe-V-Cr alloy, Zr-Ti-Nb Fe-V-Cr alloy, LaNi$_5$ alloy or the like.

According to the invention, the high molecular diene series polymer is required to have weight average molecular weight of not less than 300,000 and a hydrogenation ratio of at least 60%, preferably 80–90% on the double bond of diene portion. When the molecular weight is less than 300,000, the wear resistance and the strength at rupture are not sufficient, while when the hydrogenation ratio is less than 60%, the heat resistance is poor and further the compatibility with the low molecular diene series hydrogenated polymer to be blended is poor and also the strength at rupture and the wear resistance are considerably degraded.

On the other hand, the low molecular diene series polymer used in the invention is required to have a weight average molecular weight of 5,000–200,000 and a hydrogenation ratio of at least 90% on the double bond of diene portion. When the molecular weight is less than 5,000 or more than 200,000, the improving effect of the gripping property is small, while when the hydrogenation ratio is less than 90%, the gripping property is poor and also the compatibility with the high molecular diene series hydrogenated polymer is poor and the strength at rupture and wear resistance are degraded.

Furthermore, the low molecular diene series hydrogenated polymer is required to be added in an amount of 10–200 parts by weight based on 100 parts by weight of the high molecular diene series hydrogenated polymer. When the addition amount is less than 10 parts by weight, the sufficient improvement of the gripping property is not obtained, while when it exceeds 200 parts by weight, the strength at rupture and wear resistance are degraded.

To the rubber composition according to the invention may properly be added additives usually used in the rubber industry, such as carbon black, calcium carbonate, silica, softener, antioxidant, vulcanizing agent, vulcanization accelerator, accelerator activator and the like.

The rubber composition having the above construction according to the invention can preferably be applied to various tires. Particularly, the rubber composition can be applied to high running performance tires such as racing tire, motorcycle tire, passenger car tire and the like.

The following examples are given in illustration of the invention and are not intended as limitations thereof.

EXAMPLES 1–6, COMPARATIVE EXAMPLES 1–8

As the high molecular diene series polymer, there were synthesized styrene-butadiene copolymers having characteristics shown in the following Table 1 (microstructure of butadiene portion: cis/trans/vinyl=21/37/42(%), bound styrene content: 40 wt%).

Moreover, the hydrogenation was carried out as follows.

Into an autoclave of 5 l was charged 300 g of a polymer to from a 10% toluene solution. After the inside of the system was purged with nitrogen, a catalyst solution of nickel naphthenate-triethylaluminum-butadiene of 1:3:3 (mol ratio) previously prepared in another vessel was charged so as to be 1 mol of nickel per 1000 mol of butadiene portion in copolymer. Thereafter, hydrogen was introduced into the reaction system under a hydrogen pressure of 30 kg/cm², and the reaction was carried out at 80° C.

TABLE 1

| Sample | Mw (× 10⁴) | Hydrogenation ratio (%) |
|---|---|---|
| A | 77 | 0 |
| B | 77 | 42 |
| C | 77 | 68 |
| D | 77 | 86 |
| E | 25 | 88 |

In Table 1, the hydrogenation ratio was calculated from the reduction of unsaturated bond portion through $^1$H-NMR of 100 MHz measured at a concentration of 15% by weight using carbon tetrachloride as a solvent.

Furthermore, the weight average molecular weight ($\overline{Mw}$) was measured by means of 200 type GPC made by Waters Corp. using polystyrene as a standard sample.

Each of the diene series polymers A–E was kneaded with another components according to a compounding recipe shown in the following Table 2 and cured at 145° C. for 60 minutes. The tensile strength, heat resistance (heat aging property) and wear resistance were evaluated with respect to the obtained vulcanizates as follows:

The tensile strength was according to JIS K6031.

The heat resistance (heat aging property) was evaluated as a retention of tensile strength after the heat aging according to the following equation:

$$\frac{\text{tensile strength after heat aging at } 100° \text{ C. in air for 48 hours}}{\text{initial tensile strength}} \times 100$$

The wear resistance was evaluated by an index on the basis that Example 1 was 100 as measured by means of DIN abrasion testing machine. The larger the numerical value, the better the wear resistance.

The measured results are shown in the following Table 3.

TABLE 2

| Compounding component | part by weight |
|---|---|
| High molecular diene series polymer *1 | 100 |
| Low molecular diene series polymer *2 | described in Table 3 |
| Carbon black HAF | 100 |
| Stearic acid | 2 |
| Zinc white | 3 |
| Antioxidant 810NA *3 | 1 |
| Vulcanization accelerator DM *4 | 1.2 |
| Vulcanization accelerator DPG *5 | 0.6 |
| Sulfur | 1.5 |

*1 Polymer described in Table 1
*2 styrene-butadiene copolymer (microstructure of butadiene portion: cis/trans/vinyl = 21/35/44(%), bound styrene content: 38 wt %)
*3 N-phenyl-N'-isopropyl-p-phenylenediamine
*4 2,2'-dithio-bis-benzothiazole
*5 1,3-diphenylguanidine

TABLE 3

| | Low molecular diene series polymer | | | High molecular diene series polymer (sample) | Tensile strength (kgf/cm²) | Retention of tensile strength after heat aging (%) | Wear resistance |
|---|---|---|---|---|---|---|---|
| | Mw (× 10⁴) | Hydrogenation ratio (%) | part by weight | | | | |
| Example 1 | 4.1 | 96 | 100 | C | 210 | 91 | 100 |
| Example 2 | 9.2 | 95 | 100 | C | 227 | 92 | 105 |
| Example 3 | 4.1 | 96 | 100 | D | 204 | 94 | 99 |
| Example 4 | 9.2 | 95 | 50 | D | 221 | 94 | 106 |
| Example 5 | 9.2 | 95 | 100 | D | 213 | 95 | 103 |
| Example 6 | 14.8 | 94 | 100 | D | 228 | 95 | 106 |
| Comparative Example 1 | 4.1 | 96 | 100 | A | 65 | 68 | 71 |
| Comparative Example 2 | 4.1 | 96 | 100 | B | 92 | 77 | 78 |
| Comparative Example 3 | 4.1 | 96 | 100 | E | 57 | 95 | 63 |
| Comparative Example 4 | 4.1 | 56 | 100 | D | 177 | 93 | 88 |
| Comparative Example 5 | 0.3 | 98 | 100 | D | 184 | 94 | 83 |
| Comparative Example 6 | 25 | 91 | 100 | D | 230 | 94 | 93 |
| Comparative Example 7 | 4.1 | 96 | 7 | D | 183 | 95 | 109 |
| Comparative Example 8 | 4.1 | 96 | 250 | D | 93 | 93 | 77 |

Then, the gripping property on road surface and the wear resistance were evaluated by an actual running test for a passenger car radial tire having a tire size of P225/60 R14 in which the tread rubber was made from the above rubber composition.

The gripping property on road surface was represented by an index of a lap time on the basis that the tire of Comparative Example 4 was 100 when the tire was actually run on a dry road surface of a circuit course consisting of straight and curved lines. The larger the numerical value, the better the result. The obtained results are shown in Table 4.

TABLE 4

|  | Gripping property in actual running (index) |
| --- | --- |
| Example 1 | 103 |
| Example 2 | 102 |
| Example 3 | 104 |
| Example 4 | 100 |
| Example 5 | 102 |
| Example 6 | 101 |
| Comparative Example 1 | 100 |
| Comparative Example 2 | 101 |
| Comparative Example 3 | 97 |
| Comparative Example 4 | 100 |
| Comparative Example 5 | 100 |
| Comparative Example 6 | 101 |
| Comparative Example 7 | 96 |
| Comparative Example 8 | 103 |

As seen from Examples 1-6 of Tables 3 and 4, the rubber compositions according to the invention are excellent in the heat resistance, wear resistance, strength at rupture and gripping property on road surface and are suitable as a tread rubber composition for high performance tires.

On the other hand, in Comparative Examples 1-8, the balance among the heat resistance, wear resistance, strength at rupture and gripping property on road surface is deficient and is unsuitable as a tread rubber composition for high performance tire. Moreover, the rubber composition of Comparative Example 7 is good in the heat resistance and wear resistance, but is considerably poor in the gripping property on road surface.

As mentioned above, according to the invention, the particular high molecular diene series hydrogenated polymer is blended with the particular low molecular diene series hydrogenated polymer, whereby the heat resistance, wear resistance and gripping property on road surface, which are required as a tread rubber composition for high performance tires, can simultaneously be given at a good balance.

What is claimed is:

1. A rubber composition comprising
   (A) 10-200 parts by weight of a low molecular weight diene series polymer having a weight average molecular weight of 5,000-200,000 in which at least 90% of the unsaturated bond in the diene portion of said low molecular weight diene series polymer is hydrogenated, based on
   (B) 100 parts by weight of a high molecular weight diene series polymer having a weight average molecular weight of not less than 300,000 which 60-90% of the unsaturated bond in the diene portion of said high molecular weight diene series polymer is hydrogenated;
   wherein each of said polymer (A) and said polymer (B) is selected from the group consisting of a solution polymerized styrene-butadiene copolymer, an emulsion polymerized styrene-butadiene copolymer, natural rubber, polyisoprene rubber and polybutadiene rubber.

2. The rubber composition according to claim 1, wherein 80-90% of the unsaturated bond of said high molecular weight diene series polymer is hydrogenated.

* * * * *